United States Patent [19]

Danielsen

[11] Patent Number: 5,067,861
[45] Date of Patent: Nov. 26, 1991

[54] TOOL HOLDER WITH INTERCHANGEABLE FLUID PRESSURE ACTUATED CHUCKS

[76] Inventor: Jan Danielsen, Romellsvagen 5, 703 56 Orebro, Sweden

[21] Appl. No.: 598,068

[22] Filed: Oct. 16, 1990

Related U.S. Application Data

[63] Continuation of Ser. No. 342,246, Apr. 20, 1989.

[51] Int. Cl.$^5$ .............................................. B23B 31/20
[52] U.S. Cl. ................................. 409/234; 408/239 R; 408/239 A; 279/4; 279/46 R
[58] Field of Search ............... 409/234, 232, 233, 215, 409/144; 279/4, 1 N, 46 R, 1 A; 408/239 R, 239 A, 4, 141; 242/72 B

[56] References Cited

U.S. PATENT DOCUMENTS

| | | | |
|---|---|---|---|
| 2,955,830 | 10/1960 | Vilter | 279/58 |
| 3,250,542 | 5/1966 | Winnen et al. | 279/1 N |
| 3,397,614 | 8/1968 | Meinke | 409/231 |
| 4,709,455 | 12/1987 | D'Andrea | 409/215 X |

Primary Examiner—Larry I. Schwartz
Assistant Examiner—Robert Schultz
Attorney, Agent, or Firm—Dennison, Meserole, Pollack & Scheiner

[57] ABSTRACT

A tool holder including a drive unit having a peripheral flange about the outer end thereof, and interchangeable chuck units with similarly configured flanges for selective engagement against and releasably mounting to the drive unit flange by screw fasteners. Each chuck unit includes a self-contained fluid pressure system comprising a recess inward through the outer end thereof defined by a flexible peripheral wall with a sealed cavity therebehind. The cavity is filled with a fluid which, upon being pressurized, produces a corresponding inward flexing of the recess wall for the gripping of a tool bit.

2 Claims, 2 Drawing Sheets

TOOL HOLDER WITH INTERCHANGEABLE FLUID PRESSURE ACTUATED CHUCKS

This is a continuation of application Ser. No. 342,246, filed Apr. 20, 1989.

BACKGROUND OF THE INVENTION

The present invention relates to a tool holder for a tool-bit provided with a shaft. Such tool holders are normally arranged in a machine of one type or another, for example a drill or a machine for a mechanical machining process such as milling or grinding. The tool holder generally has an upper end provided with tapping or screw threads enabling it to be screwed into the machine. The upper part is generally conical, but may be cylindrical, and similarly provided with tapping at its upper end. A chuck of some sort is usually fitted at the lower end of the tool holder. The tool-bit with shaft is inserted into the chuck and is secured there by a number of elements which, by means of a hand tool operated by the user, can be caused to exert a clamping action. This can also be achieved by mechanical means. If the recess in the chuck is too large, a sleeve or collect is inserted into the recess, the sleeve having the same outer diameter as the chuck's inner diameter. The inner cross section of the sleeve is adjusted to the cross section of the tool-bit to be used. The retention of a tool-bit is dependent on the force with which a user can secure the tool-bit or which can be achieved by mechanical means. This force is often insufficient and the tool-bit may spin or loosen.

SUMMARY OF THE INVENTION

The present invention relates to a tool holder of the above-mentioned type and the novelty of the invention includes the provision of a retaining force for a tool-bit with shaft which may be 10,000 NM and more, reaching extremely high values in an extremely simple manner which does not require great manual or mechanical force. This is made possible by providing the recess of the retaining portion with a coherent wall inside which are one or more cavities which can be the recess can be altered. According to an advantageous embodiment, the cavity is connected to a container which may be in the form of a tube or channel. Other pressure-generating means are also possible, perhaps containing transmission means. Said cavity or cavities and said tube are filled with pressure medium, preferably oil or grease. Since the volume of the pressure medium is substantially constant, inserting an organ with different depths of penetration into said tube will force the inner wall of the recess to bulge out, thus producing a retaining force for the tool-bit inserted either directly or indirectly through a sleeve of optional material such as metal, rubber or plastic.

According to an advantageous embodiment, the cavity is tubular.

The part of the tool holder provided with said cavity, where the inner wall of the cavity can be influenced to alter the cross section of the recess may consist of a single self-contained chuck unit provided at the top with attachment means for removable securing to the upper part or drive unit of the tool holder. Preferably, both the drive unit of the tool holder and the chuck unit with the cavity are provided with outwardly directed flanges which can be joined together, for instance by means of a screw joint which enables an interchanging of chuck units.

If the recess in a particular chuck unit for receiving a tool-bit is too wide, a sleeve or collet is inserted in the recess, said sleeve having the same outer diameter as the recess and an inner diameter corresponding to the tool-bit to be used. If the range of collet sizes is not sufficient to accommodate a particular tool-bit, the screw mounted chuck unit can itself be replaced or interchanged with a similarly mountable chuck unit with a self-contained fluid pressure system for fluid pressure actuation of the chuck. The pressure medium in the cavity and in the pressure medium source can easily be displaced, thus influencing the inner wall of the recess, for instance by the insertion of a plug into the pressure medium source within the chuck unit itself. Said plug may be provided with a screw thread and thus need only be screwed in or out in order to ensure retention of a tool-bit. The pressure medium can also be influenced by a piston, the movement of which can be achieved in one way or another. The cavity may also be connected by a hose connection to a pressure medium source located some distance away.

According to the invention, a retaining torque of 10,000 NM can be achieved extremely easily and using very little force.

The present invention will be described in more detail with reference to the two sheets of drawings in which:

DESCRIPTION OF THE PREFERRED EMBODIMENT

Figure 1:
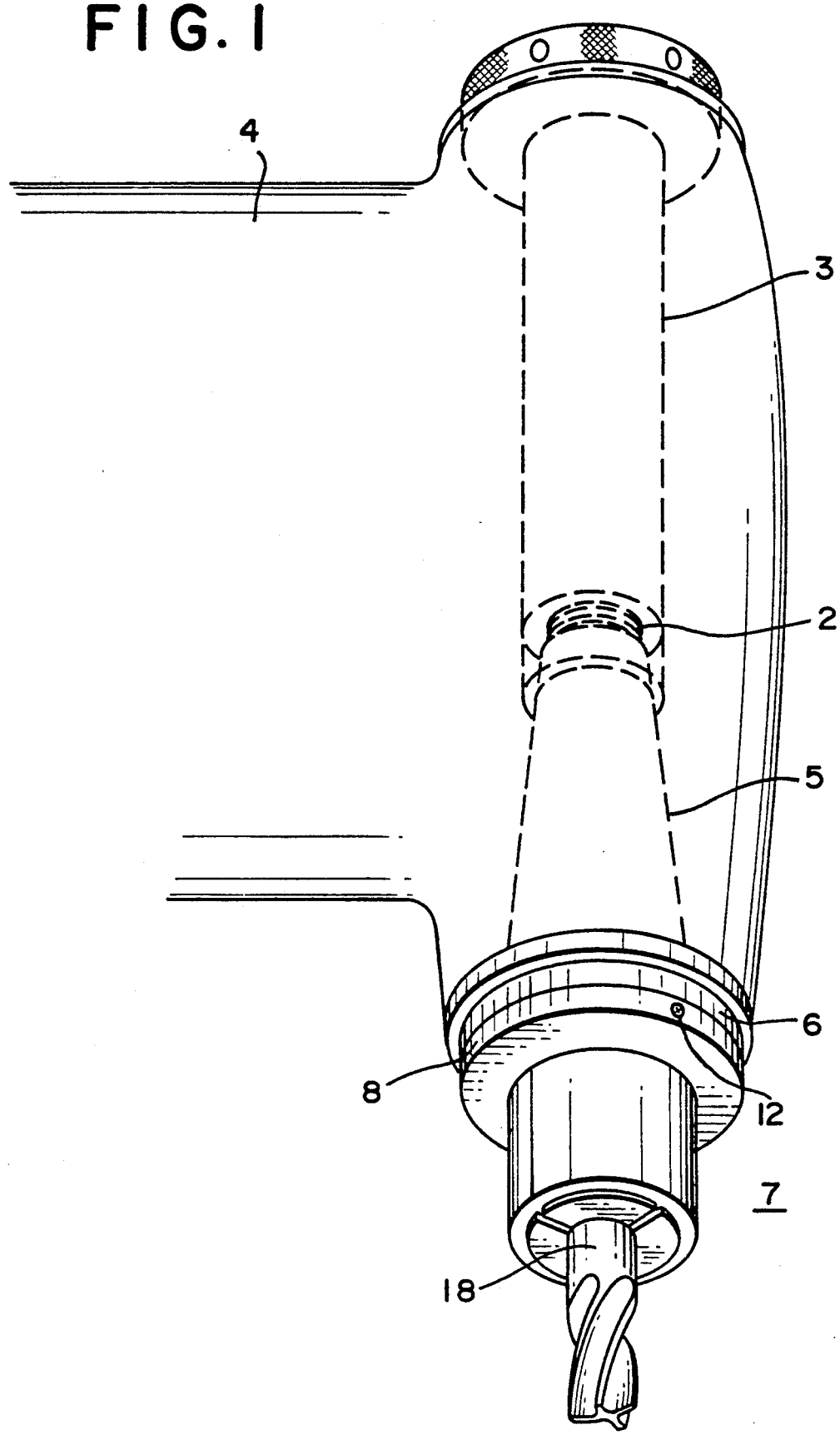
FIG. 1 shows a motor head provided with a tool holder in accordance with the invention.

In the drawings, 1 is a tool holder, the upper portion or drive unit of which is provided with threading 2 for screwing into a leading spindle 3 arranged in a motor head 4, the spindle being connected to a drive motor. The drive unit is shaped conically inward of the threaded portion 2. The conical portion is designated 5 and is intended for insertion into a conical recess in the motor head 4.

Figure 2:
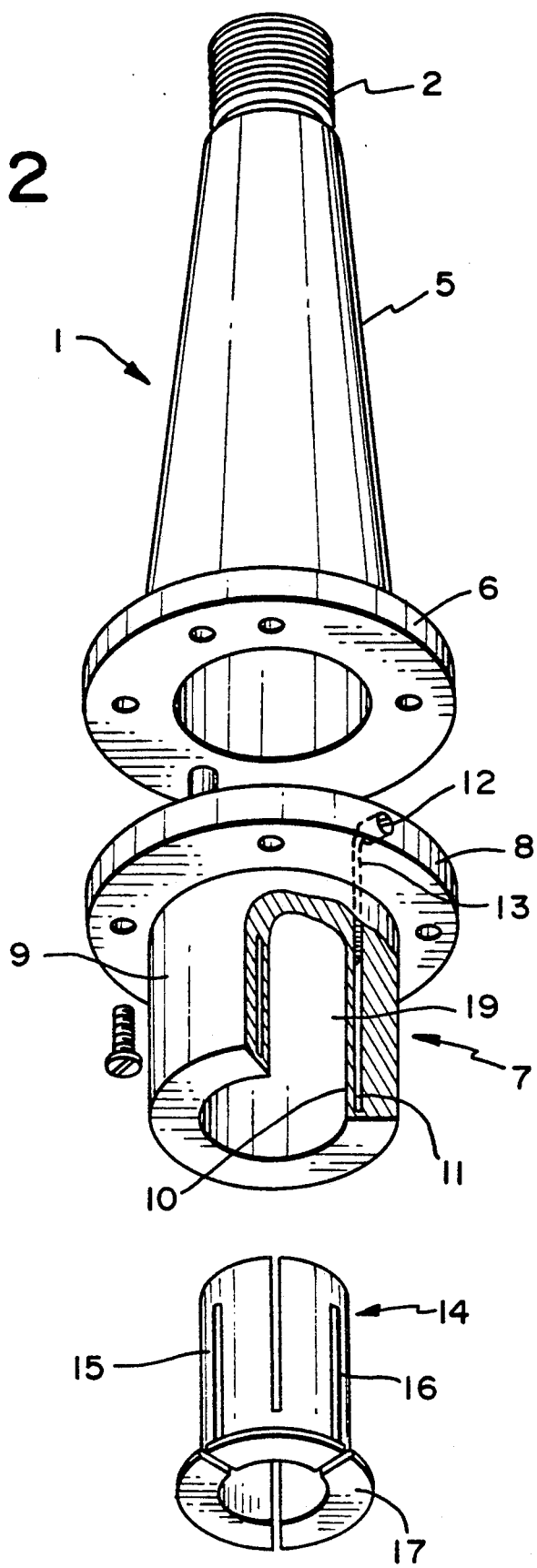
FIG. 2 shows an exploded view of said tool holder.

The upper portion or drive unit of the tool holder 1 is provided at the bottom with a radially outwardly directed flange 6 which shall cooperate in securing a separate self-contained chuck unit 7 with complete retention means for a tool-bit contained therein. The chuck unit 7 is provided at the top with a radially outwardly directed peripheral flange 8 for cooperation with the peripheral flange 6. The two flanges are secured together by one or more screw joints with appropriate apertures and screw means or other suitable attachment means for an interchange of separate self-contained chuck units in accord with the tools to be accommodated. The unit 7 comprises a tubular part 9 with a recess 19. The tubular part 9 has a thin inner wall 10, behind which is a tubular cavity 11. The tubular cavity 11 communicates with a channel 13 opening through the periphery of the flange 8 of the chuck unit and closed at the open end thereof by an adjustment screw 12 as shown in FIG. 2. The total volume of the tubular cavity 11 and the channel 13 is determined by the adjustment screw 12 and can thus be altered. If the tubular cavity and the channel 13 are filled with a pressure medium such as oil, there is minimum air in said total space, and the adjustment screw 12 assumes its outermost position, the result of the screw being screwed in will be a decrease in the total original space and the inner wall 10 will therefore move inward. This is because the oil demands a substantially constant amount of space and, since the inner wall 10 is forced inward, the shaft of a tool-bit 18 inserted in the recess 19 will be clamped with considerable force. If the cross section of the recess is too large for a tool-bit, a sleeve or collet 14 having a cross section corresponding to the cross section of the tool-bit can be inserted in the recess 19. The sleeve has a tubular portion 15 provided with a number of slits 16, and having a peripheral flange 17 at the bottom to limit its insertion into the recess 19. As illustrated, the recess 19 is cylindrical. However, the recess may obviously have any cross section, e.g. polygonal. Furthermore, the cross section of the recess 19 may be identical along its length, but it might also decrease from the outside and inward In such cases, the sleeve or collet 14 will be configured for accommodation within the recess Similarly, the aperture in the sleeve 14 for receiving a tool-bit will have a cross section corresponding to the tool-bit being used, and may be provided with a cross section which varies along its length.

While the use of collets 14 provides for the accommodation of a range of tool sizes within a specific chuck unit 7, the range and type of tools is limited by the parameters of the chuck unit. This has particularly been the situation in tool holders which utilize fluid pressure for a fixing of the tool within the chuck and which heretofore have required that the chuck be integral with or a permanent component of the drive unit.

This limited range capability of fluid pressure tool holders has been overcome in the present invention by specifically constructing the chuck as a self-contained unit incorporating not only the tool and/or collet accommodating socket, but also the complete fluid pressure system. The self-contained fluid pressure chuck unit is in turn specifically provided as an independent unit separably screw or bolt mounted to the drive unit.

Thus, fluid pressure chuck units of great variety and range can be readily interchanged on a single drive unit. The specific construction of the chuck units, with the self-contained fluid pressure systems, makes this possible through the use of a flange on each chuck unit adapted to cooperatively mate with the corresponding flange on the single drive unit for separable securement thereto.

The sleeve or collet 14 may be of any material, e.g. metal, plastic, rubber or other suitable materials. Further, the tool holder through the interchangeability of the chuck units and an adaptation of the fluid pressure system can be made to accommodate delicate materials, such as glass or similar materials to be retained. The tool holder itself is illustrated in the drawings as conical, but it should be evident that it may also be purely cylindrical.

The volume of the cavity 11 containing pressure medium is altered by the plug mentioned earlier. However, this plug may cooperate with a piston. The cavity may also be connected by a hose to a pressure medium located some distance away. The pressure medium is preferably oil, but might also consist of grease and in certain cases, the pressure medium may be gaseous, consisting of helium, for instance. As mentioned previously, the recess for receipt of a tool-bit is generally cylindrical but may also be conical, the diameter increasing inwardly from the opening.

I claim:

1. A tool holder adapted for use with a drive motor, said tool holder comprising a drive unit having a frustum-conical configuration with a first end mountable to said motor to be driven thereby, and a separate self-contained chuck unit for receiving a tool bit, said drive unit including a second end remote from said first end, said second end including a peripheral flange thereabout, said chuck unit including an inner end with a peripheral flange thereabout, and an outer end, a tool bit recess defined in said chuck unit inwardly through said outer end, said recess including a closed inner end and a continuous peripheral wall with a sealed cavity defined therebehind, fluid means filling said cavity, means for varying pressure on said fluid means, said peripheral recess wall being flexible in response to variations in the pressure on the fluid means for a selective expanding and contracting of said recess wall to selectively grip and release an inserted tool bit, the peripheral flanges of said drive unit and said chuck unit being directly engageable with each other, and releasable fastener means through said flanges for securing said flanges to each other to mount said chuck unit on said drive unit, said fastener means comprising screw means engaged through said flanges, said means for varying the pressure within said cavity, and flexing said recess wall in response thereto, comprising a channel within said chuck unit communicating with said cavity and extending therefrom, and an adjustment screw threaded in said chuck unit and into said channel for varying the volume therein and hence the pressure in said channel and the cavity communicating therewith to define a self-contained fluid pressure system within said chuck unit to enable the engagement and positioning of a tool bit in said chuck unit independent of said drive unit, said chuck unit, through the releasable fastener means, being interchangeable with similar self-contained chuck units having fluid pressure systems and peripheral flanges engageable with the drive unit flange.

2. A tool holder adapted for use with a drive motor, said tool holder comprising a drive having a frustum-conical configuration unit with a first mountable to said motor to be driven thereby, and separate interchangeable self-contained chuck units for receiving tool bits; said drive unit including a second end remote from said first end, said second end including a peripheral flange thereabout; each of said chuck units including an inner end with a peripheral flange thereabout, and an outer end, a tool bit recess defined in said chuck unit inwardly through said outer end, said recess including a closed inner end and a continuous peripheral wall with a sealed cavity defined therebehind, fluid means filling said cavity, means for varying pressure on said fluid means, said peripheral recess wall being flexible in response to variations in the pressure on the fluid means for a selective expanding and contracting of said recess wall to selectively grip and release an inserted tool bit; the peripheral flanges of said drive unit and each of said chuck units being directly engageable with each other, and releasable fastener means through said drive unit flange and an engaged flange of a selected chuck unit for securing said engaged flanges to each other to mount said selected chuck unit on said drive unit, said fastener means comprising screw means engaged through said engaged flanges; said means for varying the pressure within said cavity of each chuck unit, and flexing said recess wall in response thereto, comprising a channel within each chuck unit communicating with said cavity and extending therefrom, and an adjustment screw threaded in each chuck unit and into the corresponding channel for varying the volume therein and hence the pressure in the channel and the cavity communicating therewith to define a self-contained fluid pressure system within each chuck unit to enable the engagement and positioning of a tool bit in each chuck unit independent of said drive unit, said chuck units, through the releasable fastener means, being interchangeable on said drive unit.

* * * * *

UNITED STATES PATENT AND TRADEMARK OFFICE
CERTIFICATE OF CORRECTION

PATENT NO. : 5,067,861
DATED : November 26, 1991
INVENTOR(S) : Jan Danielsen It is certified that error appears in the above-identified patent and that said Letters Patent is hereby corrected as shown below:

Column 4, line 40, after "drive" insert --unit--.

Column 4, line 41, cancel "unit".

Column 4, line 41, after "first" insert --end--.

Signed and Sealed this

Sixteenth Day of March, 1993

Attest:

STEPHEN G. KUNIN

*Attesting Officer*   Acting Commissioner of Patents and Trademarks